(12) United States Patent
Blaugrund et al.

(10) Patent No.: US 7,551,427 B1
(45) Date of Patent: Jun. 23, 2009

(54) SMALL FORM FACTOR HARD DISK DRIVE BRACKET LATCH/RELEASE MECHANISM (75) Inventors: Dan Blaugrund, Alburquerque, NM (US); Bradley Blackwood, San Jose, CA (US); Tim Lau, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 159 days.

(21) Appl. No.: 11/786,852

(22) Filed: Apr. 13, 2007

Related U.S. Application Data (60) Provisional application No. 60/794,860, filed on Apr. 25, 2006.

(51) Int. Cl.
H05K 5/00 (2006.01)
H05K 7/00 (2006.01)

(52) U.S. Cl. .............................. 361/679.38; 361/679.33; 361/679.39

(58) Field of Classification Search ................. 361/685, 361/679.33, 679.38, 679.39
See application file for complete search history.

(56) References Cited

U.S. PATENT DOCUMENTS

| | | | | |
|---|---|---|---|---|
| 6,067,225 A * | 5/2000 | Reznikov et al. | ............ | 361/685 |
| 6,288,902 B1 * | 9/2001 | Kim et al. | ................... | 361/725 |
| 6,515,855 B1 * | 2/2003 | Yen-Kuang | .................. | 361/685 |
| 6,648,149 B2 * | 11/2003 | Robertson | ..................... | 211/26 |
| 6,680,851 B1 * | 1/2004 | Fasullo et al. | ............... | 361/740 |
| 6,952,341 B2 * | 10/2005 | Hidaka et al. | ............... | 361/685 |
| 7,110,250 B2 * | 9/2006 | Lee | ........................ | 361/679.32 |

* cited by examiner

*Primary Examiner*—Jayprakash N Gandhi
*Assistant Examiner*—Anthony M Haughton
(74) *Attorney, Agent, or Firm*—Osha • Liang LLP (57) ABSTRACT

A hard disk drive bracket includes a bezel, a lever arm attached to the bezel rotatably between a closed position against the bezel and an open position apart from the bezel, wherein a hard disk drive is locked into the hard disk drive bracket when the lever arm is in the closed position, and a multifunction wireform, wherein the multifunction wireform latches the lever arm in the closed position and releases the lever arm into the open position. The hard disk drive bracket may include a release button, wherein the multifunction wireform releases the lever arm upon pressing of the release button. The multifunction wireform may hold and bias the release button. A method of operating a hard disk drive bracket includes disposing a multifunction wireform into a bezel; attaching a lever arm to the bezel rotatably between a closed position and an open position; latching a lever arm against the bezel in the closed position and releasing the latched lever arm into the open position based on operation of the multifunction wireform. The method may include holding and biasing a release button by the multifunction wireform.

6 Claims, 9 Drawing Sheets

FIG. 11B excellent# SMALL FORM FACTOR HARD DISK DRIVE BRACKET LATCH/RELEASE MECHANISM

BACKGROUND OF INVENTION

Hard disk drive brackets come in many shapes and forms. Most of today's brackets are designed to accommodate standard 3.5" drives. Examples of hard disk drive brackets abound. Some examples of the hard disk drive brackets utilized in past products developed by Sun Microsystems, Inc. are shown in FIGS. 1-3 and described below.

Figure 1A:
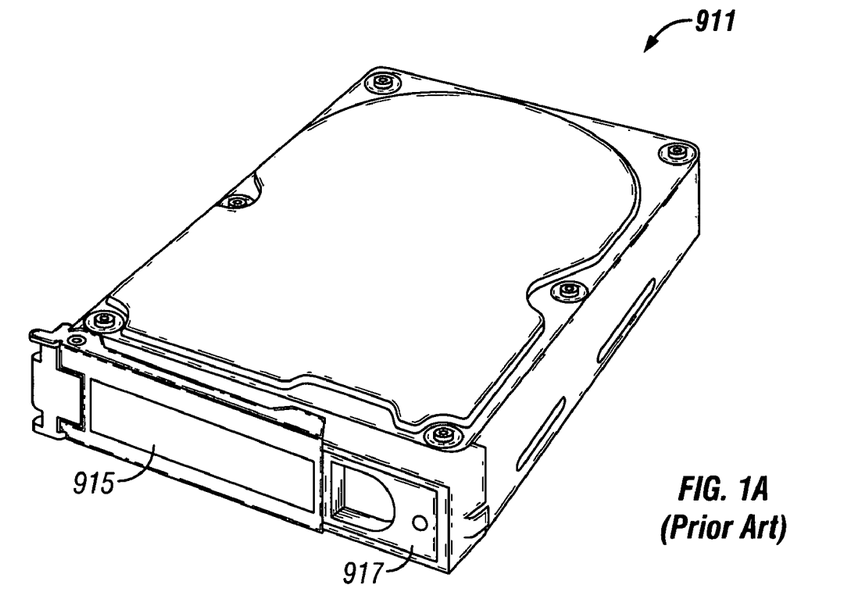
FIGS. 1(a) and 1(b) show a "SPUD" 3.5" HDD bracket.
Figure 1B:
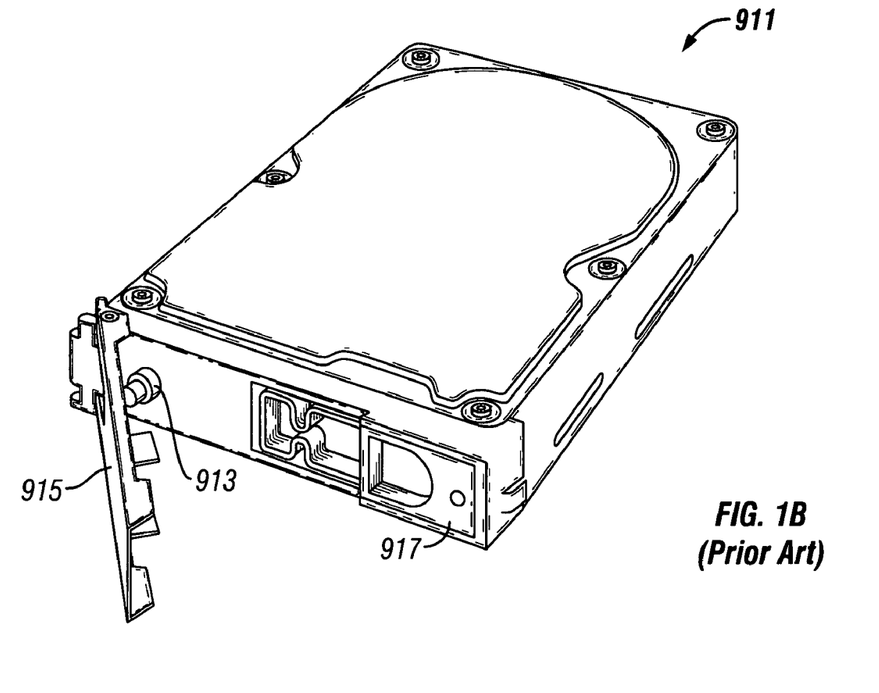

FIGS. 1(a) and 1(b) show a 3.5" Hard Disk Drive (HDD) 911 bracket referred to as "SPUD" in closed and open positions, respectively. In the "SPUD," a spring 913 is utilized to bias the door 915 outward, and has a side actuated latch release 917.

Figure 2A:
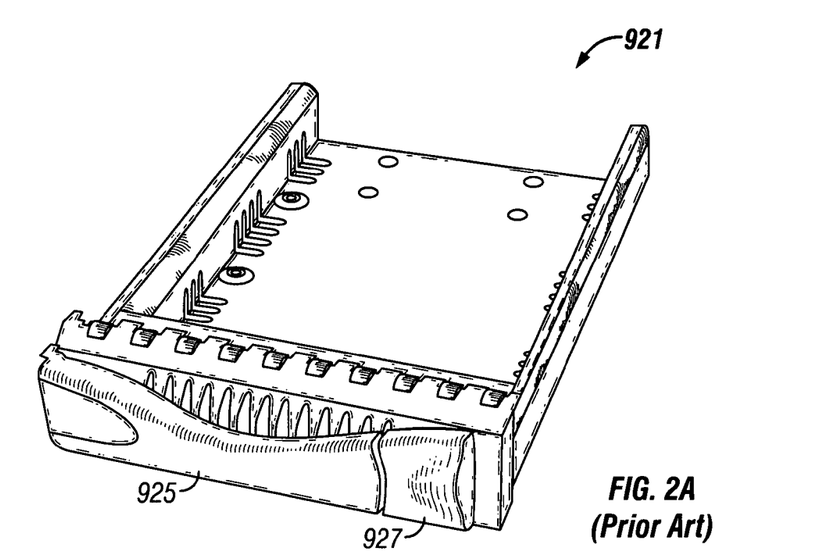
FIGS. 2(a) and 2(b) show a "SPUD 3" 3.5" HDD bracket.
Figure 2B:
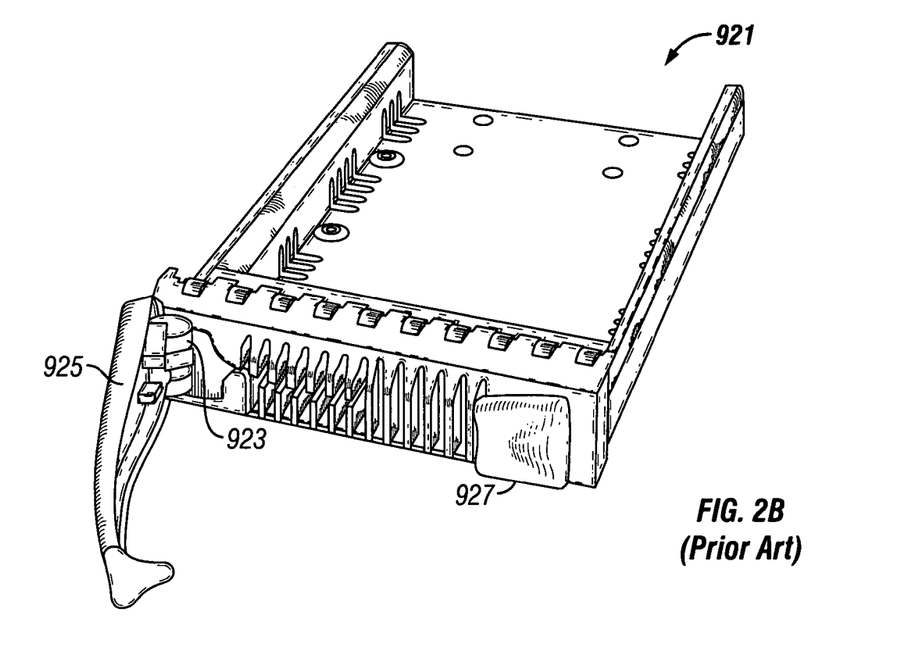

FIGS. 2(a) and 2(b) show a 3.5" HDD bracket 921 referred to as "SPUD 3" in closed and open positions, respectively. In the "SPUD 3," a side-sliding latch release 927 and lever-arm spring 923 are included in order to swing the door 925 outward.

Figure 3A:
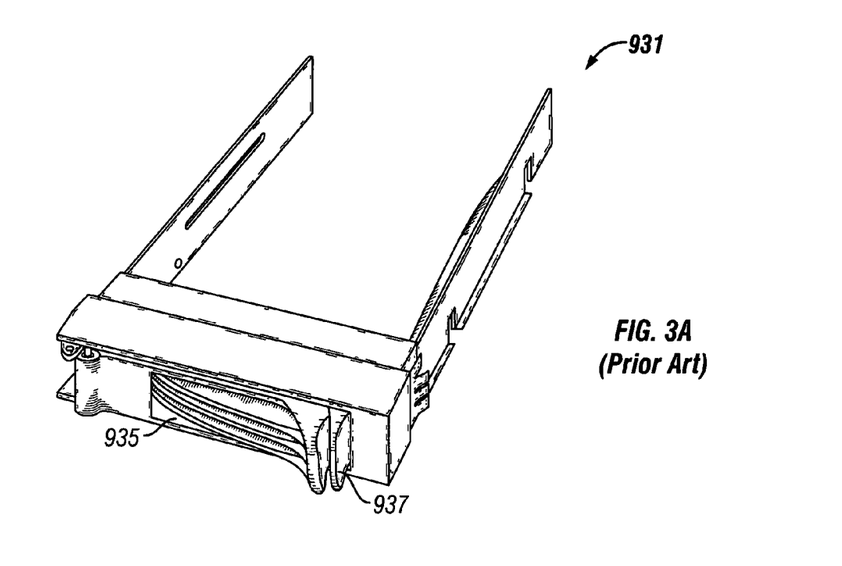
FIGS. 3(a) and 3(b) show a 3.5" HDD bracket used in, for example, a "Sun Fire V20z" server.
Figure 3B:
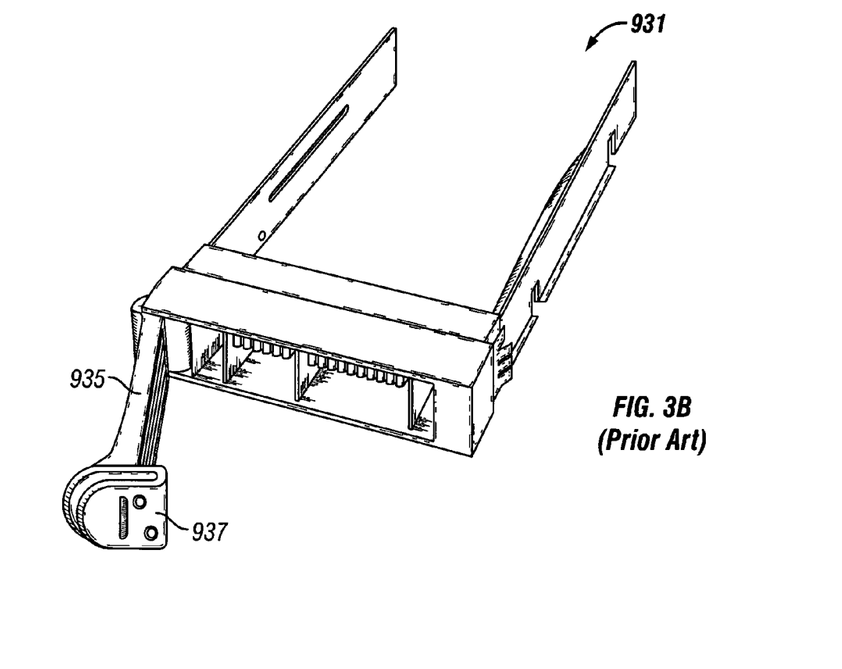

FIGS. 3(a) and 3(b) show a 3.5" HDD bracket 931 used in, for example, a "Sun Fire V20z" server. In this bracket 931, the release latch 937 is still a side action, but has been integrated into the lever arm 935.

SUMMARY OF INVENTION

In one or more embodiments of the present invention, a hard disk drive bracket comprises a bezel, a lever arm attached to the bezel rotatably between a closed position against the bezel and an open position apart from the bezel, wherein a hard disk drive is locked into the hard disk drive bracket when the lever arm is in the closed position, and a multifunction wireform, wherein the multifunction wireform latches the lever arm in the closed position and releases the lever arm into the open position. The hard disk drive bracket may comprise a release button, wherein the multifunction wireform releases the lever arm upon pressing of the release button. The multifunction wireform may hold and bias the release button.

In one or more embodiments of the present invention, a method of operating a hard disk drive bracket comprises disposing a multifunction wireform into a bezel; attaching a lever arm to the bezel rotatably between a closed position and an open position; latching a lever arm against the bezel in the closed position and releasing the latched lever arm into the open position based on operation of the multifunction wireform. The method may include holding and biasing a release button by the multifunction wireform.

Other aspects and advantages of the invention will be apparent from the following description and the appended claims.

DETAILED DESCRIPTION

New generations of server platforms incorporate small form factor (SFF) 2.5" hard disk drives. Therefore, in accordance with one or more embodiments of the present invention, a new 2.5" hard disk drive (HDD) bracket was developed to serve as a common drive bracket for future product platforms incorporating swappable, 2.5" hard disk drives. Embodiments of the present invention will be described below with reference to the drawings.

In order to support a multitude of HDD mounting applications across different products, the mechanical packaging requirements of the bracket are very constrained. In particular, because of the requirements for width and depth dimensions (e.g., for standard 78 mm×115 mm dimensions), little room is left for the bezel, mounting rails, and latch/release mechanism. In an application with such dimensions, only 8 mm of packaging depth is allowed at the front of the bracket for the front bezel, lever/locking arm, push button release, and latch. Accordingly, one or more embodiments of the present invention provide a bracket with a unique, low profile, low cost, and robust mechanism.

Figure 4A:
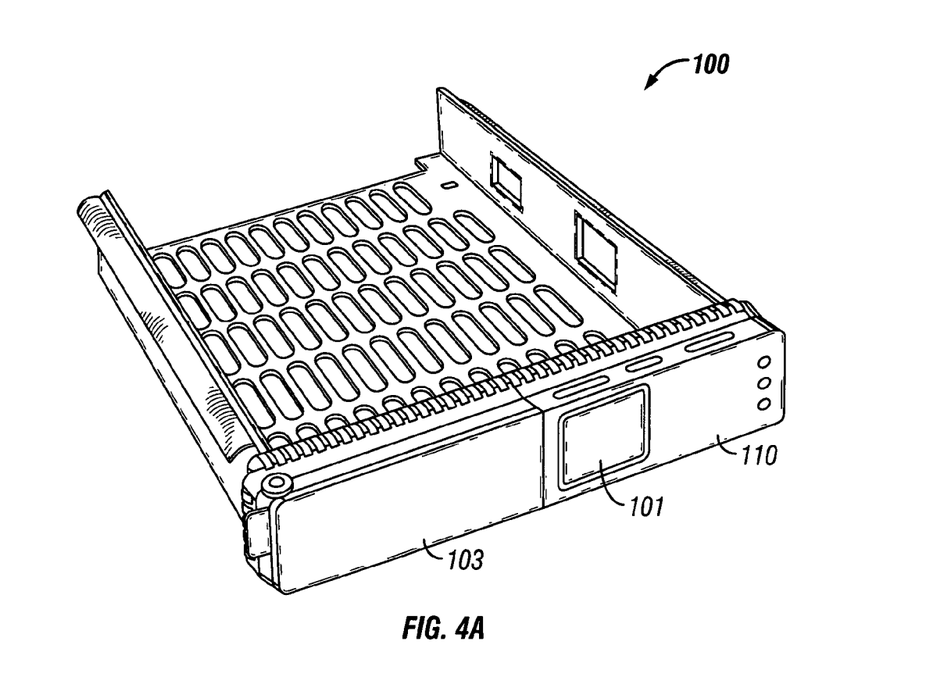
FIGS. 4(a) and 4(b) show front views of a HDD bracket in accordance with an embodiment of the present invention.
Figure 4B:
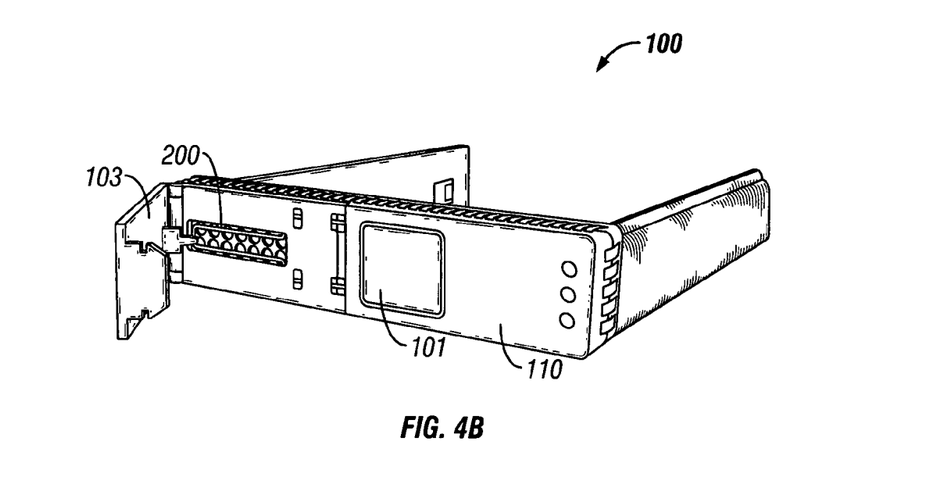

Referring to FIGS. 4(a) and 4(b), front facing views of the basic operation of a HDD bracket 100 according to an embodiment of the present invention is shown. The HDD bracket 100 has a front bezel 110, on which release button 101 and lever arm 103 are disposed. FIG. 4(b) shows the lever arm 103 in the closed position. To operate the HDD bracket 100, the user pushes the release button 101 and the lever arm 103 releases and automatically springs outward into the open position, as shown in FIG. 4(b). The user then pulls the drive carrier 105 out of the chassis. To insert the drive, the user inserts the drive carrier 105 into the chassis (with the lever arm 103 in the open position) and then closes the lever arm 103 to lock the HDD drive 100 in place in the chassis.

The design of this mechanism incorporates a simple formed wire part, referred to as a "multifunction wireform" 200, which serves three functions. The mechanism (1) latches ("locks") the lever arm 103 in the closed position; (2) holds and springs outward ("biases") the release button 101; and (3) springs outward ("primes") the lever arm 103 of the HDD bracket.

Figure 5:
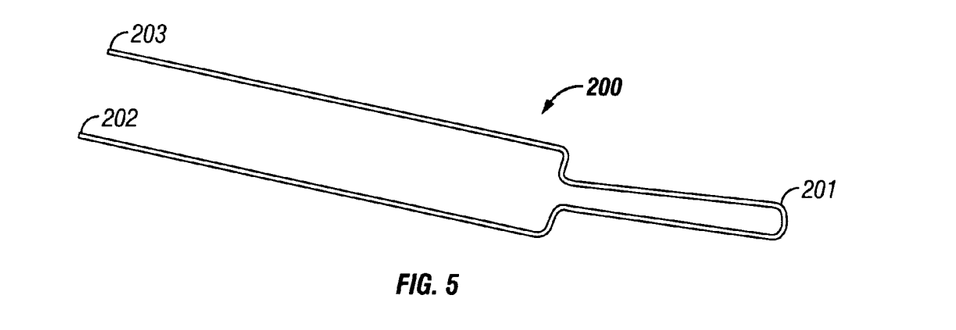
FIG. 5 shows a multifunction wireform utilized in the bracket mechanism in accordance with an embodiment of the present invention.
Figure 6:
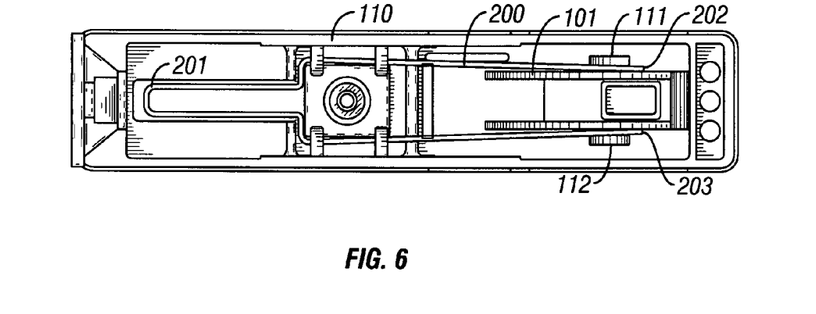
FIG. 6 shows the multifunction wireform installed into the front bezel of the bracket in accordance with an embodiment of the present invention.

FIGS. 5 and 6 show the multifunction wireform 200. A perspective view of the multifunction wireform 200 is shown in FIG. 5. FIG. 6 shows the multifunction wireform 200 installed into the bracket's front bezel 110. In one or more embodiments of the present inventions, the multifunction wireform 200 is a single wire with a closed end 201 and two free ends 202, 203.

Figure 7:
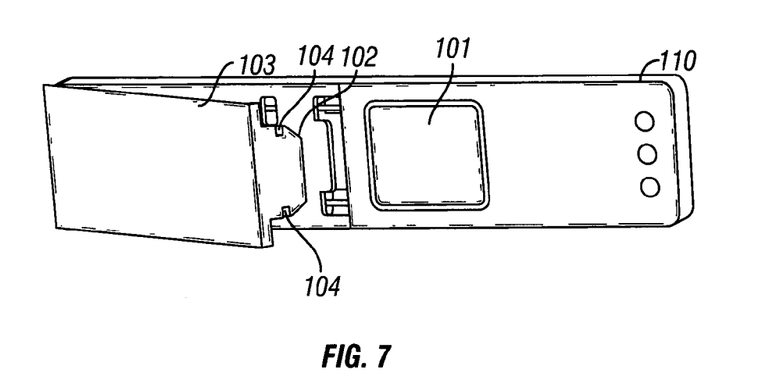
FIG. 7 shows a view of lever arm latching in accordance with an embodiment of the present invention.
Figure 8:
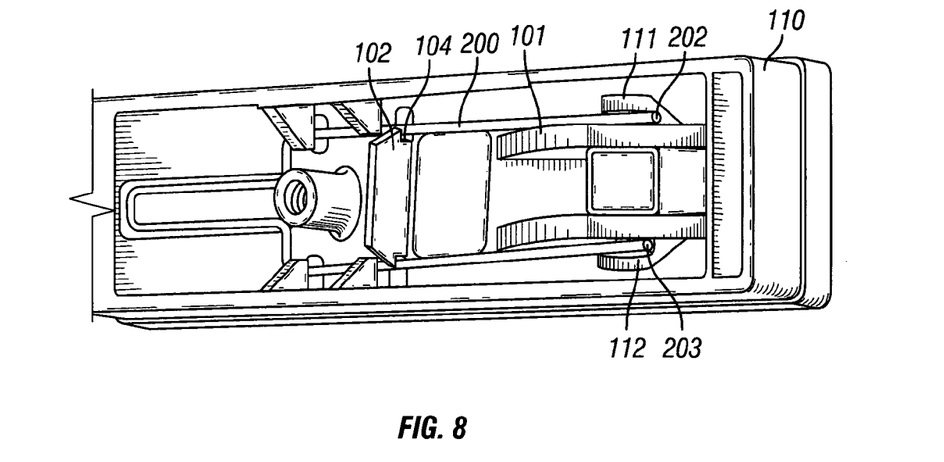
FIG. 8 shows a close-up view of the inside of the front bezel in accordance with an embodiment of the present invention.

Latching of the lever arm 103 is accomplished through the use of slots 104 added to the tapered end 102 of the lever arm 103. FIGS. 7 and 8 show how the slots 104 interface with the wires of the multifunction wireform 200 to latch the lever arm 103 in place. The tapered end 102 of the lever arm 103 pushes the multifunction wireform 200 apart when the lever arm 103 is closed. The wires of the multifunction wireform 200 then fall into the slotted features 104 and are captured, locking the lever arm 103 firmly in place. Thus, the wires of the multifunction wireform 200 hold the lever arm 103 locked closed. FIG. 8 is a close-up view of the inside of the front bezel 110 showing how the wires of the multifunction wireform 200 are captured in the lever arm 103 and slots 104.

Figure 9A:
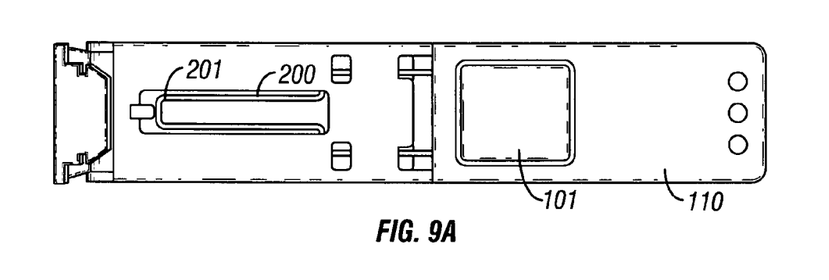
FIGS. 9(a) and 9(b) show the effect of pushing on the release button on the wires of the multifunction wireform in accordance with an embodiment of the present invention.
Figure 9B:
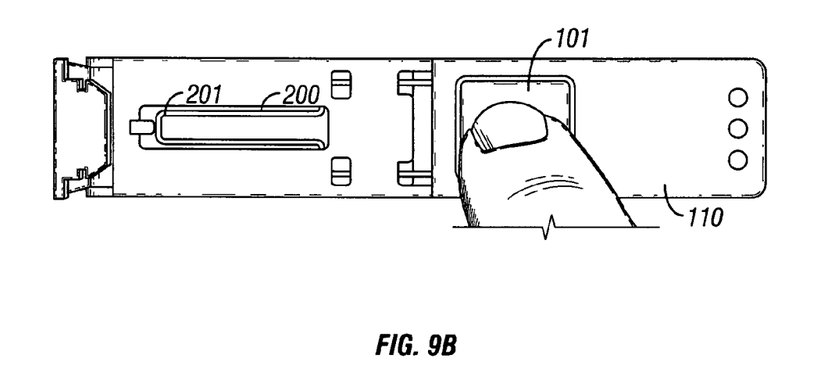

Unlatching of the lever arm 103 is accomplished through pushing the release button 101, which uses a tapered feature 106 to spread the wires of the multifunction wireform 200 apart. The wires of the multifunction wireform 200 spread and clear from the slots 104 in the lever arm 103. This frees the lever arm 103 to rotate open. FIGS. 9(a) and 9(b) show the effect of pushing on the release button 101 on the wires of the multifunction wireform 200. FIG. 9(a) shows the multifunction wireform 200 before the release button 101 is pressed, and FIG. 9(b) shows the multifunction wireform 200 as the release button 101 is pressed. As the release button 101 is pressed, the wires of the multifunction wireform 200 are forced to spread apart by the tapered feature 106, thus releasing the lever arm 103, and allowing it to rotate open.

Figure 10A:
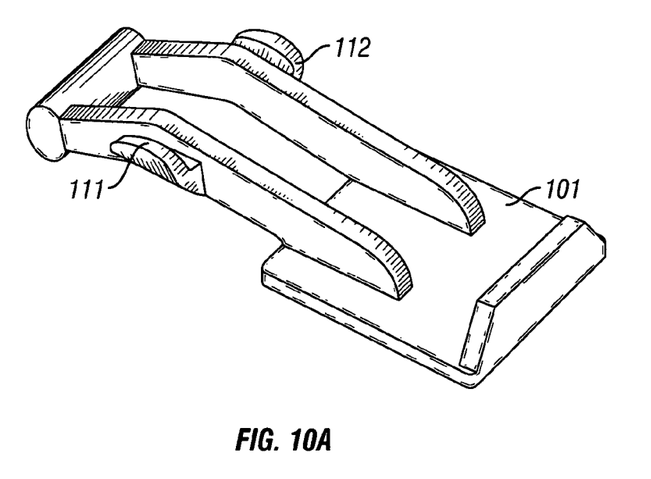
FIGS. 10(a) and 10(b) show the tapered details on the back side of the button in accordance with an embodiment of the present invention.
Figure 10B:
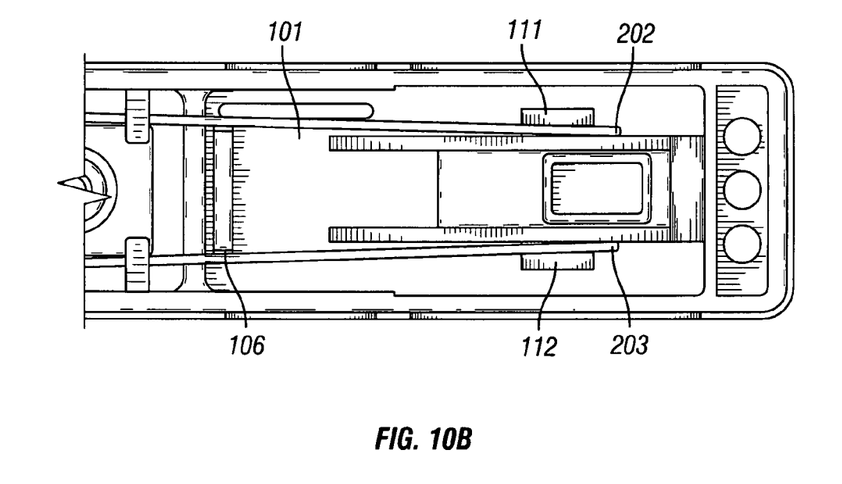

FIGS. 10(a) and 10(b) show the tapered features 106 on the back side of the release button 101 that spread the wire of the multifunction wireform 200 apart when the release button 101 is depressed. In FIG. 10(a), the tapered surfaces of the push button are clearly shown. In FIG. 10(b), the multifunction wireform 200 contacts the release button 101 in four places allowing the release button 101 to be positioned properly and to effectively spread the wires of the multifunction wireform 200 apart to unlatch the lever arm 103.

The multifunction wireform 200 is shown holding and biasing the release button 101 forward. The wires of the multifunction wireform 200 contact the release button 101 in four separate locations holding the release button 101 in proper position. Also, the release button 101 is biased forward, toward the user. The multifunction wireform 200 is also well constrained at the free ends 202, 203 by the release button 101 by constraint slots 111, 112. The constraint by the constraint slots 111, 112 assures that the wires of the multifunction wireform 200 spreads as desired in the center area when the release button 101 is depressed. In other words, the multifunction wireform 200 and release button 101 work together to constrain each other and assure consistent function.

Figure 11A:
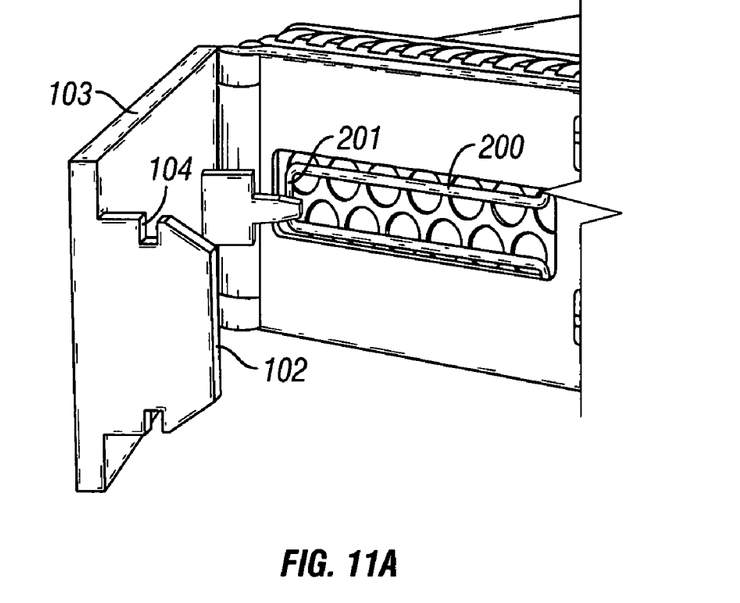
FIGS. 11(a) and 11(b) show the interaction between the closed end of the multifunction wireform and the lever arm in accordance with an embodiment of the present invention.
Figure 11B:
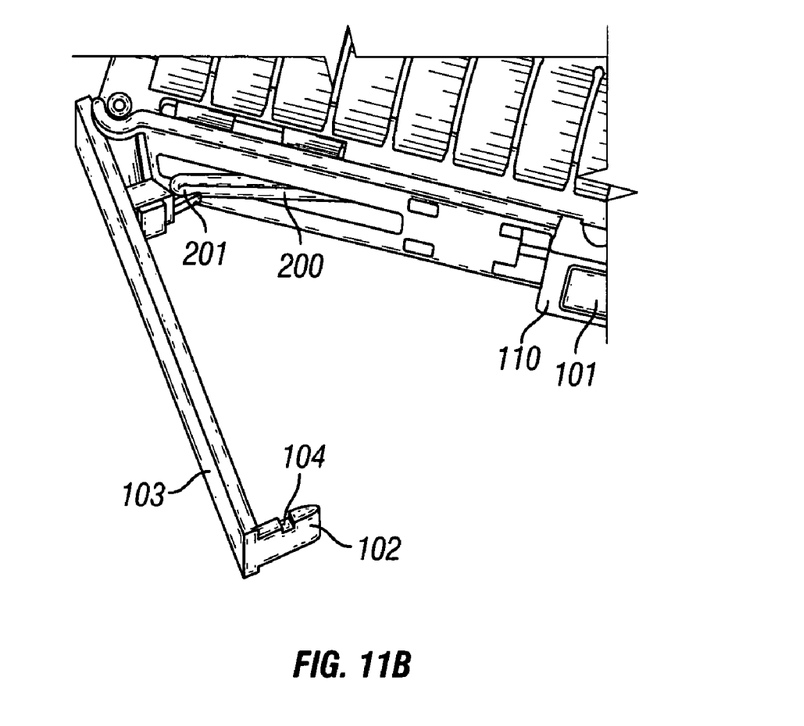

The final function of the multifunction wireform 200 is to act as a spring to automatically present the lever arm 103 to the user when the release button 101 is actuated. This function is often referred to as "priming" of the lever arm 103. FIGS. 11(a) and 11(b) show how the closed end 201 of the multifunction wireform 200 is used as a simple cantilever to spring the lever arm 103 towards the user into the open position. Priming is also important as the lever arm 103 should be open during insertion to allow the HDD drive 100 to be fully seated in the chassis.

One or more embodiments of the present invention may include one or more of the following advantages. The use of a multifunction wireform 200 reduces mechanism part count, and reduction of part count, in turn, reduces cost. The entire mechanism is space efficient. In one or more embodiments, the entire mechanism is packaged in an 8 mm×16 mm×78 mm packaging envelope. There is a user-friendly interface and easy operation. Pushing of the release button 101 to open the lever arm 103 is very intuitive to users.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hard disk drive bracket comprising:
   a bezel having a face surface,
   a lever arm attached to the bezel rotatably between a closed position against the bezel and an open position apart from the bezel, wherein a hard disk drive is locked into the hard disk drive bracket when the lever arm is in the closed position,
   a multifunction wireform, wherein the multifunction wireform latches the lever arm in the closed position and releases the lever arm into the open position, and
   a release button formed within the face surface of the bezel, wherein the multifunction wireform releases the lever arm upon pressing the release button in a first direction,
   wherein the multifunction wireform holds and biases the release button in a second direction,
   wherein the first direction and the second direction are opposite and transverse to the face surface of the bezel.

2. The hard disk drive bracket of claim 1, wherein the multifunction wireform springs the lever arm into the open position.

3. The hard disk drive bracket of claim 1, the lever arm comprising a slotted, tapered end, wherein the slotted, tapered end latches to the multifunction wireform in the closed position.

4. The hard disk drive bracket of claim 1, wherein a maximum overall depth of the bezel, multifunction wireform, and lever arm in the closed position is 8 mm.

5. A hard disk drive bracket comprising:
   a bezel having a face surface,
   a lever arm attached to the bezel,
   means for latching the lever arm against the bezel, wherein a maximum depth of the bezel, means for latching, and latched lever arm is 8 mm, and
   means for releasing the latching of the lever arm, wherein the means for releasing the latching of the lever arm is biased by the means for latching the lever arm against the bezel in a direction transverse to the face surface of the bezel.

6. A method of operating a hard disk drive bracket comprising:
   disposing a multifunction wireform into a bezel, the bezel having a face surface;
   attaching a lever arm to the bezel rotatably between a closed position and an open position;
   latching a lever arm against the bezel in the closed position and releasing the latched lever arm into the open position based on operation of the multifunction wireform; and
   holding a release button and biasing the release button in a direction transverse to the face surface of the bezel by the multifunction wireform.

* * * * *